Patented Jan. 31, 1928.

1,658,015

UNITED STATES PATENT OFFICE.

ARTHUR HOWE CARPENTER, OF LA GRANGE, AND PHILIP C. HUNTLEY, OF RIVERSIDE, ILLINOIS, ASSIGNORS TO THE VITROLITE COMPANY, OF PARKERSBURG, WEST VIRGINIA, A CORPORATION OF WEST VIRGINIA.

DECORATED GLASS AND METHOD OF MAKING SAME.

No Drawing.    Application filed December 10, 1925.   Serial No. 74,630.

The present invention has for its object to produce a simple and novel method of changing the surface characteristics of glass, glass-like or vitreous slabs or other shapes during the process of manufacturing the latter, so as to obtain any one of a large variety of effects, each differing from the natural surface that the article would have as the result of the ordinary process of manufacture.

Since the novel method of manufacture results in a new product, the present invention may also be regarded as having for its object to produce a glass, glass-like or vitreous slab or other article having a novel surface finish.

The present invention is particularly applicable to cast slabs of glass or glass-like material and, for the sake of brevity it will be described in connection with such slabs, although of course it will be understood that it may be employed advantageously in connection with vitreous materials of all kinds.

In the manufacture of the slabs, when the molten metal first assumes the shape of the slab it is of course very hot and plastic. The present invention contemplates laying on the slab at this time a sheet, wholly or partially covering the surface of the slab, which will combine with or adhere to the surface of the slab and alter the appearance of such surface. This sheet is preferably in the form of glass cloth, either matted or woven. The material of the sheet may have a somewhat lower fusing point than the material of which the slab is made, to insure a complete union between the sheet and the slab. A roller may be passed over the sheet so as to roll it more or less into the slab.

The woven or matted sheet may have designs painted or otherwise placed thereon, or it may be made from glass threads or fibres differing from each other in color and so disposed as to form distinct designs or other effects.

The plain or woven cloth of glass may be decorated by first coating it, by dipping or otherwise, with lacquer or other adhesive material, and then applying sands or pigments in different designs, by sifting these materials upon the glass through stencils having the openings therein covered with screens of fine mesh. When the glass cloth, with its sand or pigment design made in this way, is rolled into the top of the hot glass slab, the partial fusing of the glass cloth will combine with or entrap the sand or sifted minerals or pigments in such a way as to make them a permanent part of the slab. It has heretofore been proposed to place sands, finely divided minerals, or pigments directly on the hot surface of a slab, but the present method is simpler and more apt to be uniformly successful, since the application of the designs is, in the first instance, to a cold surface. In other words, where the designs are applied in the first instance directly to the slab, the work must be done in the presence of an intense heat, so that the same care cannot be exercised as is possible when the designs are placed on a cold sheet. A very thin sheet of glass may be employed for carrying out this particular method, instead of glass cloth. The thin sheet of glass may be of the same composition as that of the slab, so that the ultimate effect will be the same as though the decorating materials had been applied directly to the slab. Instead of a lacquer a glue-like oil or any other material that will dry and afterwards be destroyed in the rolling process, may be employed.

In the case of the matted or felted sheet, there could be incorporated small quantities of a material like nitro-cellulose which will burn completely on contact with the hot glass slab, removing all trace of carbon and, at the same time furnishing sufficient heat to fuse the top surface of the slab and the glass fabric together. Heat may of course be applied in other ways after the sheet has been placed in position as, for example, by passing a hot flame over the covered slab.

A somewhat similar effect may be obtained by covering the slab with a sheet, decorated or otherwise, of a material that will adhere to the top of the slab as, for example, a thin sheet of asbestos cloth, and then pouring a thin layer of transparent or translucent glass on top of the whole.

In the claims the word glass is used to cover not only glass but glass-like and other vitreous materials.

By the foregoing method a slab may be produced easily and at comparatively small expense, without changing the regular process of manufacturing a slab, with any desired surface ornamentation, and embodying any desired color scheme, regardless of the color of the material used in manufacturing a slab.

What is claimed as new is:

1. The method of producing a surface finish on a glass member, which consists in placing on the same, while in a hot, plastic condition, a glass cloth, and then pressing the cloth against said member.

2. The method of producing a surface finish on a glass member, which consists in placing on the same, while in a hot, plastic condition, a glass cloth, and then rolling the cloth into said member.

3. The method of producing a surface finish on a glass member, which consists in placing on the same, while in a hot, plastic condition, a glass cloth, and then applying heat to insure a union between the cloth and said member.

4. The method of producing a surface finish on a glass member, which consists in placing on the same while in a hot, plastic condition, a glass cloth having a fusing point below that of said member.

5. The method of producing a surface finish on a glass member, which consists in placing on the same, while in a hot, plastic condition, a glass cloth containing a material which will burn on contact with said member and fuse the contacting surfaces of said member and said cloth and cause them to unite.

6. The method of producing a surface finish on a glass member, which consists in placing on the same, while in a hot, plastic condition, a glass cloth having designs thereon.

7. The method of producing a surface finish on a glass member, which consists in placing on the same, while in a hot, plastic condition, a woven glass cloth having designs therein formed by colored glass threads.

8. A glass member having a face formed of glass cloth.

9. A glass member having on one face a decorated cloth and a layer of glass covering the cloth.

10. The method of producing a surface finish on a glass member, which consists in cementing divided material to the surface of a thin glass sheet, and then rolling the sheet onto the surface of a vitreous body while the latter is in a heated plastic state.

11. The method of producing a surface finish on a glass member which consists in cementing to a thin sheet of glass, finely divided decorating material, by means of a substance that will be dissipated under the influence of heat, and then rolling said sheet upon said member while the latter is in a hot plastic state.

In testimony whereof, we sign this specification.

ARTHUR HOWE CARPENTER.
PHILIP C. HUNTLEY.